United States Patent [19]
Gentile

[11] Patent Number: 5,335,827
[45] Date of Patent: Aug. 9, 1994

[54] MULTI-CAVITY DISPENSING REFILL CARTRIDGE

[75] Inventor: James L. Gentile, Orange, Conn.

[73] Assignee: Chesebrough-Pond's USA Co., A Division of Conopco, Inc., Greenwich, Conn.

[21] Appl. No.: 995,049

[22] Filed: Dec. 22, 1992

[51] Int. Cl.$^5$ .............................................. B67D 5/00
[52] U.S. Cl. ................... 222/137; 222/145; 222/327
[58] Field of Search .............. 222/135, 136, 137, 327, 222/145, 320

[56] References Cited

U.S. PATENT DOCUMENTS

| | | | |
|---|---|---|---|
| 825,680 | 7/1906 | Raymond | 215/6 |
| 1,363,064 | 12/1920 | Stegath | 222/94 |
| 1,698,404 | 1/1929 | Hopkins | 222/94 |
| 1,699,532 | 1/1929 | Hopkins | 222/94 |
| 1,736,264 | 11/1929 | Johnson | 215/6 |
| 2,058,251 | 10/1936 | Nitardy et al. | 221/60 |
| 2,166,307 | 7/1939 | Libby | 221/60 |
| 2,296,047 | 9/1942 | Morgan et al. | 222/327 |
| 2,376,944 | 5/1945 | Songer | 222/390 |
| 2,512,178 | 6/1950 | Sherbondy | 222/327 |
| 2,661,871 | 12/1953 | Huenergardt | 222/129 |
| 2,752,920 | 7/1956 | Kurkjian | 128/261 |
| 2,789,731 | 4/1957 | Marraffino | 222/129 |
| 2,819,723 | 1/1958 | Meyer | 132/116 |
| 2,918,199 | 12/1959 | Marraffino | 222/1 |
| 2,925,938 | 2/1960 | Parsons | 222/94 |
| 2,944,704 | 7/1960 | Taylor | 222/94 |
| 2,944,705 | 7/1960 | Strumor | 222/94 |
| 2,954,144 | 9/1960 | Elam et al. | 222/82 |
| 2,959,327 | 11/1960 | Bloom | 222/94 |
| 2,973,883 | 3/1961 | Modderno | 222/94 |
| 3,105,615 | 10/1963 | Koga | 222/94 |
| 3,166,221 | 1/1965 | Nielsen | 222/137 |
| 3,179,290 | 4/1965 | Whitney | 222/1 |
| 3,188,056 | 6/1965 | Trumbull et al. | 259/37 |
| 3,197,071 | 7/1965 | Kuster | 222/94 |
| 3,200,995 | 8/1965 | Gangwisch | 222/94 |
| 3,217,931 | 11/1965 | Farrar et al. | 222/94 |
| 3,266,671 | 8/1966 | Gelpey | 222/94 |
| 3,310,201 | 3/1967 | Guarr et al. | 221/197 |
| 3,311,265 | 3/1967 | Greighton, Jr. et al. | 222/327 X |
| 3,326,416 | 6/1967 | Hayes | 222/4 |
| 3,335,912 | 8/1967 | Reeves, Jr. | 222/94 |
| 3,369,714 | 2/1968 | Dewees et al. | 222/327 |
| 3,442,424 | 5/1969 | Prussin et al. | 222/81 |
| 3,455,489 | 7/1969 | Meshberg | 222/94 |
| 3,458,076 | 7/1969 | Babcock | 215/16 |
| 3,486,661 | 12/1969 | Friedrich et al. | 222/95 |
| 3,490,651 | 1/1970 | Abplanalp | 222/94 |
| 3,499,387 | 3/1970 | Zippel | 103/38 |
| 3,503,539 | 3/1970 | O'Donnell | 222/95 |
| 3,506,157 | 4/1970 | Dukess | 222/94 |
| 3,508,682 | 4/1970 | Hollis et al. | 222/48 |

(List continued on next page.)

FOREIGN PATENT DOCUMENTS

294672 12/1988 European Pat. Off.
2095844 11/1972 France.

Primary Examiner—Andres Kashnikow
Assistant Examiner—Anthoula Pomrening
Attorney, Agent, or Firm—Brumbaugh, Graves, Donohue & Raymond

[57] ABSTRACT

A disposable multi-cavity refill cartridge, for use with a reusable base and a reusable dispensing head for the simultaneous coextension of at least two flowable materials. The disposable refill cartridge has two hollow and separate parallel inner cylinders for each containing a flowable material. The inner cylinders have a first generally open top end which can be temporarily sealed until the refill cartridge is combined with a reusable dispensing head. The second or bottom end of the refill cylinders telescopically and slidingly accommodate parallel piston heads which are compressibly engageable with piston rods of a reusable base. The piston heads ride sealingly along the interior walls of the inner refill cylinders and when compressed by the piston rods, they force the flowable material to flow out of the refill cylinders and through the outlet means of the dispensing head. Once the flowable materials have been expended, the refill cartridge can be discarded and a new one can be used in conjunction with the reusable base and dispensing head.

11 Claims, 6 Drawing Sheets

U.S. PATENT DOCUMENTS

| | | | |
|---|---|---|---|
| 3,525,997 | 8/1970 | O'Donnell | 222/95 |
| 3,532,254 | 10/1970 | Burke | 222/94 |
| 3,540,623 | 11/1970 | Wittke et al. | 222/94 |
| 3,543,966 | 12/1970 | Ryan et al. | 222/94 |
| 3,570,719 | 3/1971 | Schiff | 222/137 |
| 3,591,054 | 7/1971 | Miles | 222/135 |
| 3,599,838 | 8/1971 | LaVange | 222/129 |
| 3,603,485 | 9/1971 | Vivier | 222/129 |
| 3,608,782 | 9/1971 | Sathicq | 222/94 |
| 3,613,956 | 10/1971 | McCulloch | 222/136 |
| 3,630,415 | 12/1971 | Morane et al. | 222/129 |
| 3,651,931 | 3/1972 | Hsiung | 206/47 A |
| 3,672,544 | 6/1972 | Marand | 222/94 |
| 3,710,984 | 1/1973 | Webster | 222/145 |
| 3,731,848 | 5/1973 | Nakanishi | 222/129 |
| 3,735,900 | 5/1973 | Gores | 222/145 |
| 3,747,804 | 7/1973 | Raaf et al. | 222/1 |
| 3,767,078 | 10/1973 | Gortz et al. | 220/63 R |
| 3,767,085 | 10/1973 | Cannon et al. | 222/327 X |
| 3,788,520 | 1/1974 | Dukess | 222/94 |
| 3,799,398 | 3/1974 | Morane et al. | 222/39 |
| 3,814,287 | 6/1974 | Darbon et al. | 222/94 |
| 3,814,298 | 6/1974 | Hansen | 222/153 |
| 3,850,346 | 11/1974 | Richardson et al. | 222/145 |
| 3,870,147 | 3/1975 | Orth | 206/222 |
| 3,876,111 | 4/1975 | Swain | 222/94 |
| 3,884,396 | 5/1975 | Gordon et al. | 222/327 |
| 3,885,710 | 5/1975 | Cohen | 222/145 |
| 3,918,612 | 11/1975 | Voulgaris | 222/144 |
| 3,931,912 | 1/1976 | Hsung | 222/94 |
| 3,964,643 | 6/1976 | Morane et al. | 222/145 |
| 3,966,090 | 6/1976 | Prussin et al. | 222/94 |
| 3,980,222 | 9/1976 | Hood | 229/22 |
| 4,010,872 | 3/1977 | Lozano et al. | 222/94 |
| 4,014,463 | 3/1977 | Hermann | 222/145 |
| 4,040,420 | 8/1977 | Speer | 128/218 M |
| 4,046,288 | 9/1977 | Bergman | 222/135 |
| 4,062,475 | 12/1977 | Harris et al. | 222/95 |
| 4,062,477 | 12/1977 | Morane | 222/145 |
| 4,073,406 | 2/1978 | Goncalves | 222/94 |
| 4,089,437 | 5/1978 | Chutter et al. | 222/94 |
| 4,098,435 | 7/1978 | Weyn | 222/94 |
| 4,121,739 | 10/1978 | Devaney et al. | 222/137 |
| 4,159,066 | 6/1979 | Silver | 222/129 |
| 4,240,566 | 12/1980 | Bergman | 222/135 |
| 4,261,481 | 4/1981 | Speer | 222/135 |
| 4,271,984 | 6/1981 | Ducros et al. | 222/94 |
| 4,344,919 | 8/1982 | Kelterbaum | 422/133 |
| 4,356,935 | 11/1982 | Kamin | 222/327 X |
| 4,360,130 | 11/1982 | Nishimura et al. | 222/153 |
| 4,457,454 | 7/1984 | Meshberg | 222/95 |
| 4,460,109 | 7/1984 | Ducros et al. | 222/94 |
| 4,461,403 | 7/1984 | Prahs | 222/129 |
| 4,463,875 | 8/1984 | Tepic | 222/82 |
| 4,471,888 | 9/1984 | Herb et al. | 222/137 |
| 4,487,757 | 12/1984 | Kiozpeoplou | 424/7.1 |
| 4,509,641 | 4/1985 | Scieri et al. | 206/219 |
| 4,528,180 | 7/1985 | Schaeffer | 424/52 |
| 4,566,610 | 1/1986 | Herb | 222/137 |
| 4,582,224 | 4/1986 | Proksa et al. | 222/135 |
| 4,585,149 | 4/1986 | Zulauf | 222/94 |
| 4,687,663 | 8/1987 | Schaeffer | 424/52 |
| 4,693,398 | 9/1987 | Voss et al. | 222/327 |
| 4,742,940 | 5/1988 | Wilkinson | 222/162 |
| 4,747,517 | 5/1988 | Hart | 222/137 |
| 4,767,026 | 8/1988 | Keller et al. | 222/137 |
| 4,771,919 | 9/1988 | Ernst | 222/145 X |
| 4,813,871 | 3/1989 | Friedman | 433/90 |
| 4,869,394 | 9/1989 | Hurst | 222/197 |
| 4,964,539 | 10/1990 | Mueller | 222/94 |
| 4,974,756 | 12/1990 | Pearson et al. | 222/145 |
| 4,981,241 | 1/1991 | Keller | 222/137 |
| 5,020,694 | 6/1991 | Pettengill | 222/137 |
| 5,038,963 | 8/1991 | Pettengill et sl. | 222/145 |

MULTI-CAVITY DISPENSING REFILL CARTRIDGE

BACKGROUND OF THE INVENTION

The present invention relates to rigid telescopically arranged multi-cavity dispensing containers for flowable material, such as tooth paste and the like, from which it is desired to dispense simultaneously two or more reactive substances which require separate storage until time of use. More particularly it relates to a disposable refill cartridge, for use in a dispensing container of the above type, which can be used in conjunction with a reusable dispensing head and a reusable base.

There exists a desire to provide sodium bicarbonate and peroxide gel as components of toothpaste. Sodium bicarbonate is a well known and commonly used abrasive and cleaner. Peroxide gel is regarded as a beneficial ingredient to help promote healthy gums. These components are reactive when mixed, and therefore must be maintained separately until time of use.

U.S Pat. Nos. 5,020,694 to Pettengill and U.S. Pat. No. 5,038,963, to Pettengill and Gentile, which are hereby incorporated by reference, disclose rigid piston type multi-cavity dispensing containers for the simultaneous coextrusion in predetermined proportions of two or more materials which may have different rheologies. The lower body member of the containers has a base and two or more piston rods with pistons attached thereto. The upper body member has parallel cylinders for containing the flowable materials and outlet means for dispensing the materials. The lower end of the cylinders receive the pistons whereby the relative compression of upper and lower body members forces the flowable materials out through the outlet means. This produces a single, banded unmixed stream of material that can be neatly and easily applied onto the narrow width of a toothbrush. If, after all of the flowable materials are expended, the upper and lower members are pulled apart, the piston heads remain attached to the piston rods of the lower member. Thus any upper body refill unit would not come equipped with pistons to seal the flowable materials within the upper body parallel cylinders. Such a refill unit would be messy and impractical. Accordingly, both upper and lower body members of these designs are discarded after the contents of dispenser are used up. This produces unnecessary waste and is not the most economical of arrangements.

U.S. patent application Ser. No. 07/901,670, to Gentile, which is hereby incorporated by reference, discloses a multi-cavity dispensing refill cartridge to be used with a reusable base. The refill cartridge has two hollow, separate parallel cylinders for containing flowable material. One end of each cylinders is in fluid communication with outlet means while the other end telescopically and slidingly accommodate piston heads. A reusable base with piston rods is used to compress piston heads in the refill cartridge thereby dispensing the flowable material. Once the flowable material is expended, the refill cartridge can be discarded and a new one can be used with the reusable base. While this design is more environmentally friendly than past designs, there is still room for improvement. In particular, because the refill cartridge of the '670 application contains the means for dispensing the flowable materials (i.e. outlet assembly, nozzle, cap and a rigid dispensing head to be pressed upon in the dispensing of the flowable material) more material than is absolutely necessary is discarded each time the refill cartridge is replaced.

Thus it is an object of this invention, for ecological and economical reasons, to provide a multi-cavity dispensing refill cartridge which can be used in conjunction with a reusable base and a reusable dispensing head, for the simultaneous coextrusion, in predetermined portions, of two or more flowable materials, which may have different rheologies, upon the relative compression of the reusable dispensing head and the reusable base, to produce a single, banded unmixed stream of material that can neatly and easily be applied onto the narrow width of a toothbrush. It is a further object to provide such a refill cartridge which, in conjunction with the reusable base and reusable dispensing head, dispenses a single stream of unmixed material and which provides segregation of the component materials within the dispenser both prior to and after dispensing.

SUMMARY OF THE INVENTION

In accordance with the present invention there is provided a disposable multi-cavity refill cartridge, for use with a reusable base and a reusable dispensing head for the simultaneous coextrusion of at least two flowable materials.

The reusable dispensing head has at least two hollow and separate parallel outer cylinders having a first generally closed end and outlet channels at the closed end. The disposable refill cartridge has two hollow and separate parallel inner refill cylinders which are each telescopically accommodated within one of the outer cylinders of the dispensing head. Each inner refill cylinder contains one of the flowable materials. The inner refill cylinders have a first generally open top end which can be temporarily sealed until the refill cartridge is combined with the reusable dispensing head. Once loaded in the reusable dispensing head, the open end of each inner refill cylinder is in fluid communication with the outlet channels of the dispensing head. The second or bottom end of the inner refill cylinders, telescopically and slidingly accommodate parallel piston heads which are compressably engagable with piston rods of the reusable base. The piston heads conform to ride sealingly along the interior walls of the inner refill cylinders so as to force the flowable materials to flow toward the open top end upon relative compression of the inner refill cylinders and piston heads. The flowable material flows out of the inner cylinders and through the outlet means of the dispensing head.

Once the disposable refill cartridge has been emptied, it can be discarded, and the dispensing head and reuseable base, which comprise the bulk of the material of the entire unit, can be reused in conjunction with a new refill cartridge.

For a better understanding of the present invention together with other and further objects, reference is made to the following description, taken in conjunction with the accompanying drawings, and its scope will be pointed out in the appended claims.

DETAILED DESCRIPTION

Figure 1:
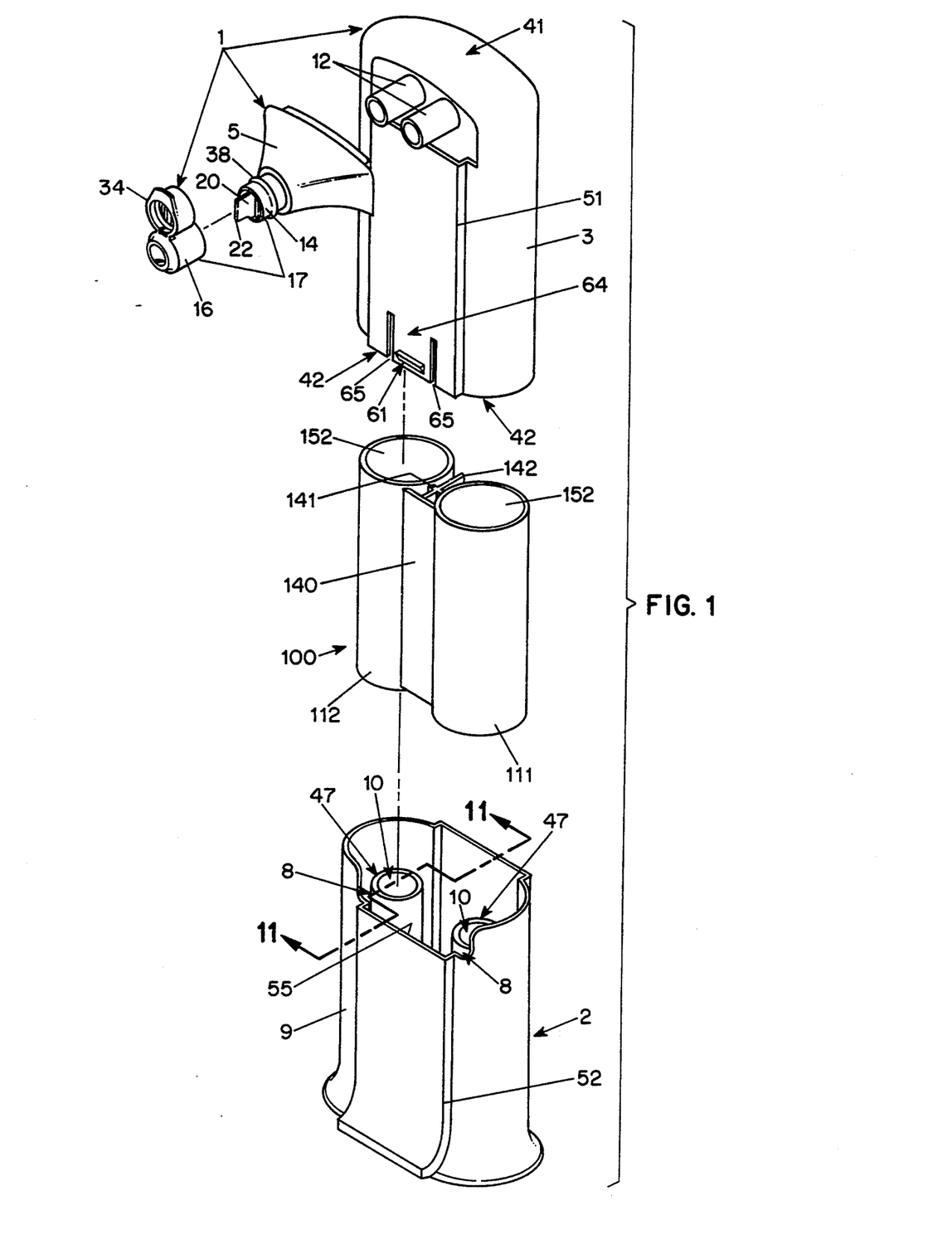
FIG. 1 is an exploded view of a refillable multi-cavity dispenser composed of a reusable dispensing head a refill cartridge and a reusable base.

An exploded view of a refillable multi-cavity dispenser composed of a reusable dispensing head 1, a reusable base 2, and a refill cartridge 100, is shown in FIG. 1. Each cylinder of the refill cartridge 100 contains one of two flowable materials. In use, the refill cartridge 100 is loaded within the dispensing head 1 and together they are mounted on resuable base 2. The relative compression of the dispensing head 1 and the base 2 causes flowable material to be forced out of the refill cartridge to the outlet channels 12 and through outlet means 17. Each flowable material follows a separate path and is maintained segregated from the other until it is finally dispensed by nozzle 16. Once the flowable materials in the refill cartridge have been used up, the dispensing head and base can be pulled apart. The refill cartridge can then be removed from the dispensing head and replaced with a fresh cartridge.

The dispensing head 1 has a upper shroud 3 which incorporates two hollow, separate, and parallel outer cylinders. The top end 41 of each outer dispensing cylinder is generally closed except for the outlet channels 12 while the bottom end 42 of each outer dispensing cylinder slidingly and telescopically receives one of the inner cylinders 111 and 112 of the refill cartridge 100.

Figure 2:
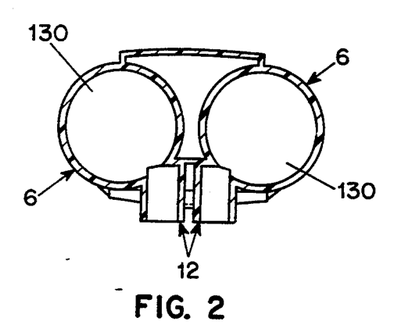
FIG. 2 is a sectional view of the FIG. 1 dispensing head taken through the outlet channels.

Inner refill cylinders 111 and 112 each contain one of two reactive flowable materials. When the refill cartridge 100 is loaded in the dispensing head 1, the top ends 152 of the inner refill cylinders are open providing fluid communication between the flowable material contained therein, the upper portions 130 of the outer cylinders and the outlet channels 12. As shown in FIG. 2, a sectional view taken through the center of the outlet channels 12, outlet channels 12 provide fluid communication between the outer cylinder upper portions 130 and outlet means 17. Outlet means 17 comprises outlet assembly 5 and nozzle 16. Nozzle 16 is sealed by hinged cap 34.

Figure 3:
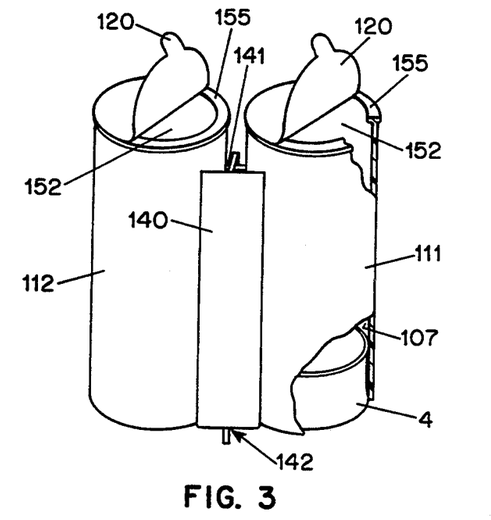
FIG. 3 shows a perspective view of a refill cartridge.

Referring to FIG. 3, which is a frontal cutaway view of refill cartridge 100, it can be seen that the bottom end of each inner refill cylinder telescopically and slidingly accommodates a piston head 4 which conforms to ride sealingly within the inner walls 107. The top end 152 of the inner refill cylinders 111 and 112 can be temporarily sealed by removable peel off seals 120. Thus the flowable materials can be completely sealed within the refill cartridge 100 allowing it to be handled and sold as a unit separate and independent from the dispensing head 1 and reusable base 2.

A flange 155 extends along the top edge of the inner cylinders. Flange 155 provides a surface which peel off seals 120 can adhere to. Furthermore, flanges 155 provide a seal between the inner and outer cylinders. This seal prevents flowable material from flowing into the area between the outer wall of the inner cylinder and the inner wall of outer cylinder. The flowable material is therefore constrained in such a way that it must flow out of the first end of the inner cylinder and into the upper portion 130 of the outer cylinders. From there the flowable materials each flow along their separate segregated paths through the outlet channels 12 and the outlet means 17. The flange 155 also provides for a friction fit which keeps the inner cylinders from falling out of the outer cylinders.

Figure 4:
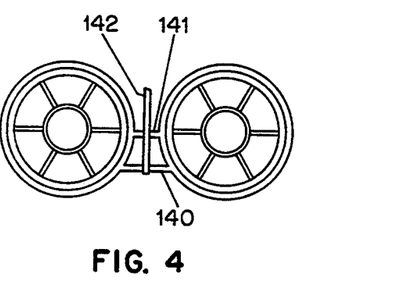
FIG. 4 is the FIG. 3 refill cartridge as viewed from below.
Figure 5:
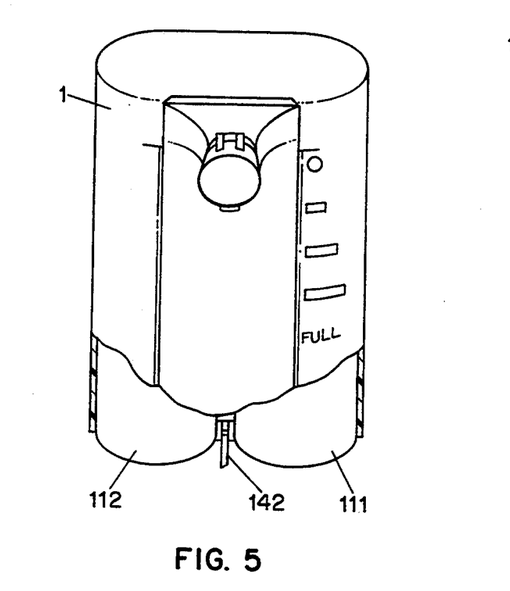
FIG. 5 is a frontal cutaway view of a refill cartridge loaded in a dispensing head.

Cylinders 111 and 112 are connected to each other by connecting bars 140 and 141 which are shown clearly in FIG. 4. Pull tab 142 is coupled to the connecting bars. Referring to FIGS. 3 and 5 it can be seen that pull tab 142 extends below the bottom ends of inner refill cylinders 111 and 112 to provide a surface which can be grasped so that the refill cartridge can be pulled out of the dispensing head once all of the flowable material has been expended.

Connecting bars 140 and 141 also serve to properly orient the refill cartridge 100 within dispensing head 1. Proper orientation of the refill cartridge insures that the flowable materials flow through the same separate path each time a new refill cartridge is loaded into the dispensing head. This is important because the two flowable materials are reactive. Thus, if a refill cartridge were improperly loaded, the new flowable material would react with residual flowable material in the outlet means 17, outlet channels 12 and the upper portions 130 of the outer dispensing cylinders.

Figure 6:
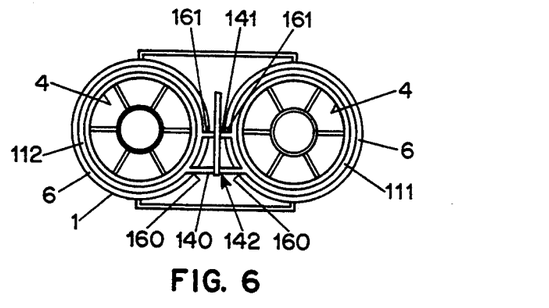
FIG. 6 is a bottom view of the FIG. 5 dispensing head and refill cartridge.

FIG. 6 shows a bottom view of a refill cartridge loaded in a dispensing head. The connecting bars 140 and 141 extend through corresponding slots 160 and 161 in the outer dispensing cylinders 6 of dispensing head 1. Both the connecting bars and slots are parallel to but offset from the imaginary plane which connects the axes of the cylinders. Accordingly, the refill cartridge can only be mounted in the one orientation in which the slots align with the connecting bars. Other means of properly orientating the refill cartridge are easily conceivable. For example, if the two sets of outer and inner refill cylinders were of different sizes, this difference would serve to properly orient the refill cartridge.

Figure 7:
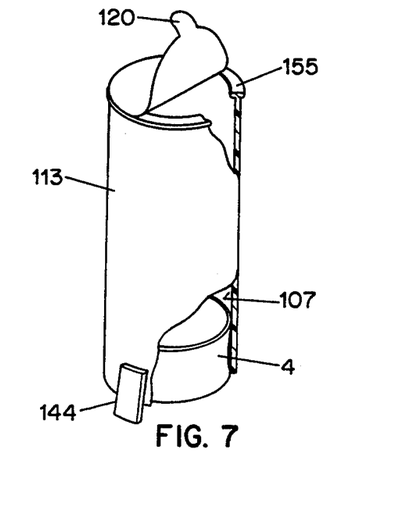
FIG. 7 is a single refill cylinder.
Figure 8:
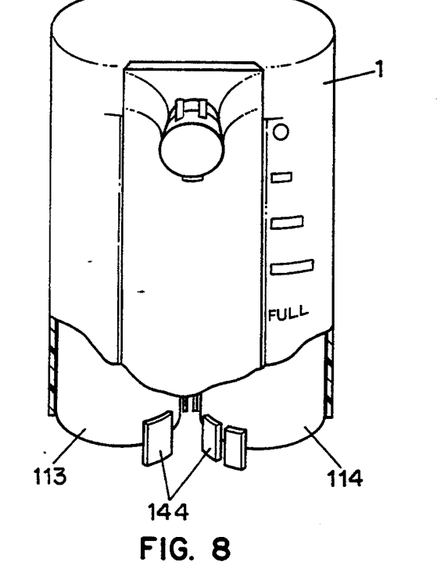
FIG. 8 is a frontal cutaway view of two single refill cylinders loaded in a dispensing head.
Figure 8A:
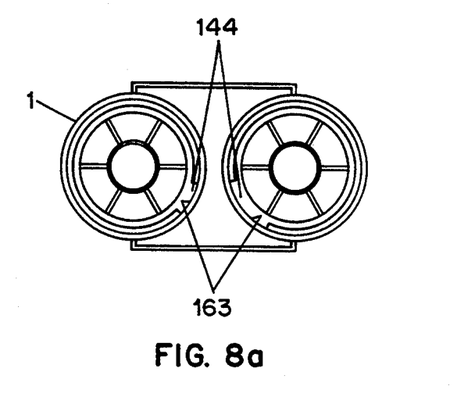
FIG. 8a is a bottom view of the FIG. 8 dispensing head loaded with two single refill cylinders.

An alternative embodiment of the present invention is shown in FIGS. 7 and 8 and 8a. The principal difference of this alternative embodiment is that the refill cartridge comprises two separate cylinders 113 and 114 which are not attached to each other. Like the cylinders of the prior embodiment, cylinders 113 and 114 can both be sealed at their top ends by removable peel off seals 120 which seal against flange 155. Their bottom ends telescopically and slidingly accommodate piston heads 4.

In this embodiment pull tabs 144 serve both to remove the cylinders when they are empty and to insure that each refill cylinder is only inserted in the proper outer dispensing cylinder of the dispensing head 1. As shown in FIG. 8a, there are slots 163 in each outer dispensing cylinder which correspond to the tabs of the refill cylinders so as to insure that the proper inner refill cylinder can only be inserted in the proper outer cylinder of the dispensing head 1.

Figure 10:
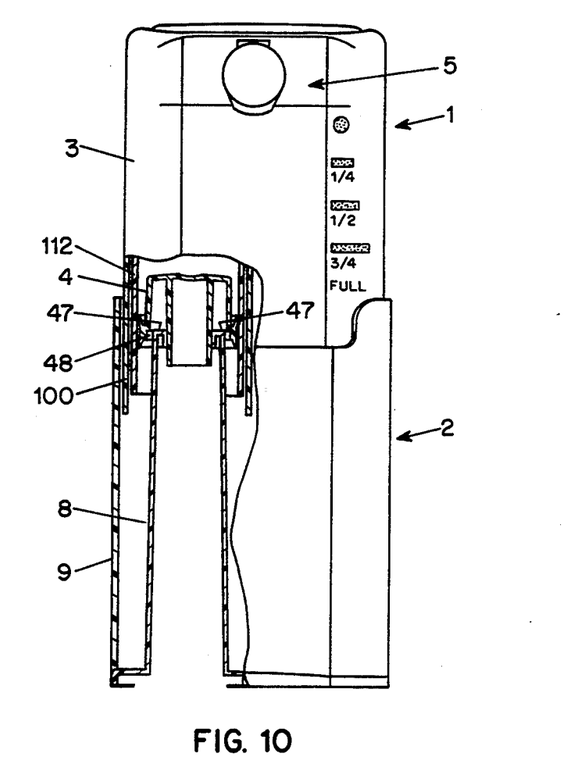
FIG. 10 is a frontal cutaway view of a refill cartridge loaded in a dispensing head which in turn is mounted on a reusable base.
Figure 11A:
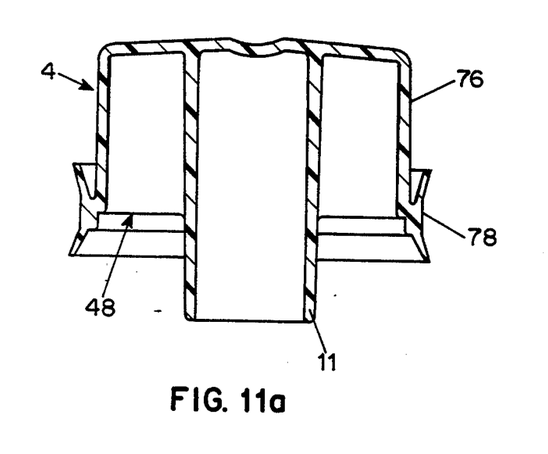
FIGS. 11a and 11b are respectively a sectional side view and a bottom view of a piston head.
Figure 11B:
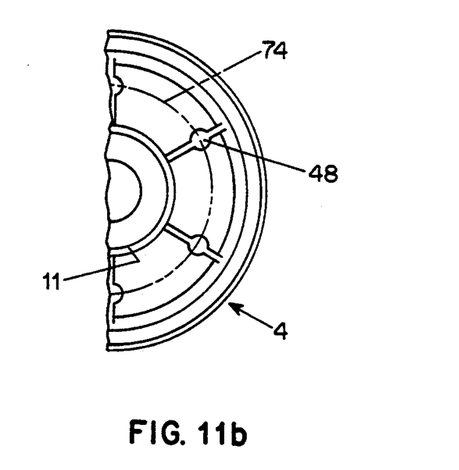

The remaining discussion pertains to either of the two aforementioned embodiments of the invention. Referring back to FIG. 1 it can be seen that the reusable base 2 has a pair of parallel piston rods 8, with openings 10. Openings 10 are designed to surround the control portion 11, shown in FIGS. 11a and 11b, of the piston heads 4. The openings 10 are dimensioned such that central portion 11 can easily slide into and out of them. This makes the piston heads 4 compressibly engagable with piston rods 8. In other words, when the dispensing head 1, with the refill cartridge 100 loaded therein, and the reusable base 2 are compressed together, edge 47 of the piston rods 8 abuts and presses upon the bottom portion 48 of piston heads 4 as shown in FIG. 10. Referring to FIGS. 11a and 11b, which are respectively a sectional view from the side and bottom view of a piston head 4, it can be seen that bottom portion 48 of the piston head 4 is the bottom edges of ribs 74 which extend between the cap portion 76 of piston head 4 and central portion 11. In addition to providing a surface for edges 47 of the piston rods 8 to press against, ribs 74 also contribute to the structural stiffness of the piston heads 4.

When the dispensing head 1 and refill cartridge 100 are pulled apart from the reusable base 2, central portions 11 of the piston heads 4 slide easily out of openings 10. Thus the piston heads 4 only engage the piston rods 8 when refill cartridge 1 and reusable base 2 are compressed. Other compressibly engagable arrangements are also possible. For example, the piston heads 4 could be provided with a flat bottom which could engage a flat top of the piston rods 8. The provision of lower portions 11 and openings 10, however, help to keep the piston heads properly oriented within cylinders 111 and 112.

As shown in FIG. 1, reusable base 2 is dimensioned to telescopically receive dispensing head 1 with refill cartridge 100 loaded therein. Specifically, upper shroud 3 is arranged to closely conform in sliding relation with lower shroud 9. The upper and lower shrouds 3 and 9 include means for guiding linear motion between the dispensing head 1 and reusable base 2, shown as conforming longitudinal projecting ridges 51 and 52. These ridges are longitudinal, outward, rectangular extensions of the shrouds 3 and 9 having parallel side walls and flat facing surfaces. The projecting ridge 52 of the lower shroud 9, which forms an inner groove 55, is dimensioned to receive longitudinal ridge 51 of the upper shroud 3. When the two shrouds are assembled and compressed the longitudinal ridges 51 and 52 serve to guide the relative motion of the dispensing head and the reusable base, preventing their relative rocking and providing smooth, equal, linear motion of the piston heads even when the flowable materials have different rheologies.

Figure 9:
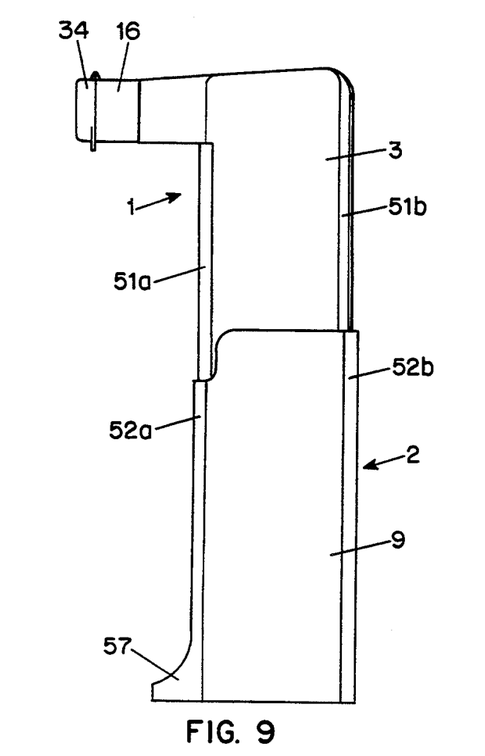
FIG. 9 is a side view of a reusable dispensing head mounted on a reusable base.

The shrouds 3 and 9 may be provided with longitudinal projecting ridges on both their front and back sides. These are shown as 51a, 51b, 52a, 52b in FIG. 9. In addition, front ridges 51a and 52a may have different widths then back ridges 51b and 52b. These then serve to orient the reusable base with respect to the dispensing head. This is especially useful when the dispensing head is to be used with a reusable base which has an extension such as extension 57 designed to prevent the forward tipping of the multi-cavity dispenser when downward pressure is applied to the dispensing head 1.

It is understood that the means for guiding linear motion between the refill cartridge and the reusable base may be of any acceptable shape and comprise a plurality of extensions, both inward and outward. In addition to providing guided relative motion of the shrouds, the extensions improve the mechanical rigidity of the shrouds.

Referring to FIG. 10, when dispensing head 1 and the reusable base 2 are compressed, piston rods 8 simultaneously and equally push upwards the piston heads 4, in inner cylinders 111 and 112, thereby forcing the flowable reactive materials upwards and into the outlet channels 12 and through outlet assembly 5. Flowable materials from each of the outlet channels 12 is received by outlet assembly 5, shown in FIGS. 12 and 13, which provides for a forward facing dispensing nozzle. Outlet assembly 5 is fitted about outlet channels 12 and converges so as to end in an outlet passage 14. Outlet passage 14 has two passageways 15, each of which connects through one of the outlet channels 12 to one of the upper portions 130 of the two cylinders 6. The outlet passage 14 of outlet assembly 5 is arranged to receive a separate nozzle 16. Outlet assembly 5 and nozzle 16 together comprise the outlet means 17 as shown in FIG. 1.

Figure 12:
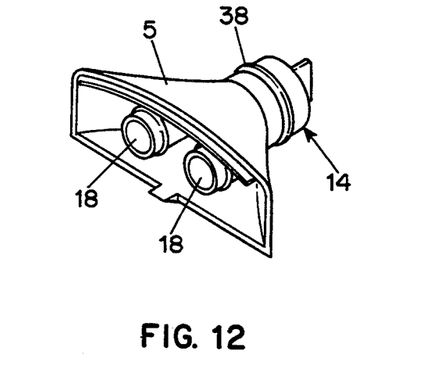
FIG. 12 is a perspective view of an outlet assembly.
Figure 13:
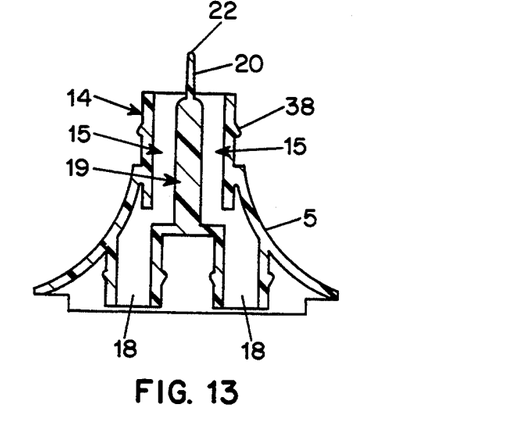
FIG. 13 is a sectional view of an outlet assembly.

The outlet channels 12 receive sleeves 18 of the outlet assembly 5 shown in FIGS. 12 and 13. As the tube sleeves 18 converge, they form a common rigid barrier 19. The outlet passage 14 is bisected by a flat rigid septum 20 extending from the barrier 19 and sitting fixedly within the inner walls of the outlet passage 14. The septum 20 is tapered cross-sectionally and ends in a straight edge 22. The cross-section of the septum edge 22 is a sharp angle approximated by a very small radius. The sides of the septum are preferably textured, for example by vapor honing, to a dull finish to promote adherence of the products thereto, which together with the taper causes the product streams to converge into a single stream as they emerge from adjacent outlet openings 23 shown in FIG. 14.

The septum 20 acts to keep the two reactive materials separate as they emerge from the cylinders 6 and also prevents reaction and obstruction of the outlet means 17 by reaction products. The flowable materials converge as they flow through the outlet means 17 but the two streams do not meet until they have fully left the outlet means opening 23. The taper design of the septum 20 causes the two streams to gradually converge until they meet at the septum edge 22 beyond the end of the outlet means opening 23. At this point they smoothly touch and continue to flow onto the intended surface, e.g. toothbrush, as a single, substantially cylindrical, banded stream. This stream is convenient and easy to direct with accuracy upon a limited surface area.

The diameter of the emerging stream may be regulated according to the packaging specifications. For example, nozzle 16, shown in FIGS. 1, 14 and 15, which snaps on around the outlet passage 14 by engaging ridge 38 may have an interior taper which reduces the effective outlet passage diameter as shown in FIG. 15. In such an embodiment, the length of the septum edge 22 is reduced and the side edges of the septum conform to the converging inner shape 35 of the nozzle 16.

Figure 14:
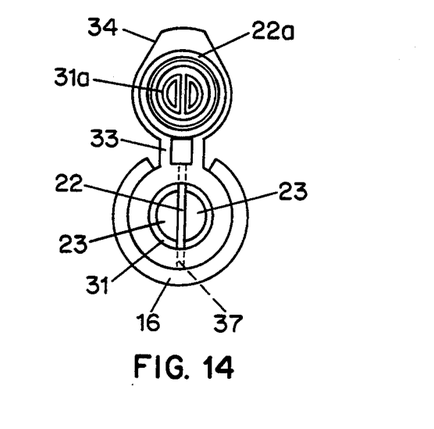
FIG. 14 is a frontal view of a nozzle with an opened, hinged cap.
Figure 15:
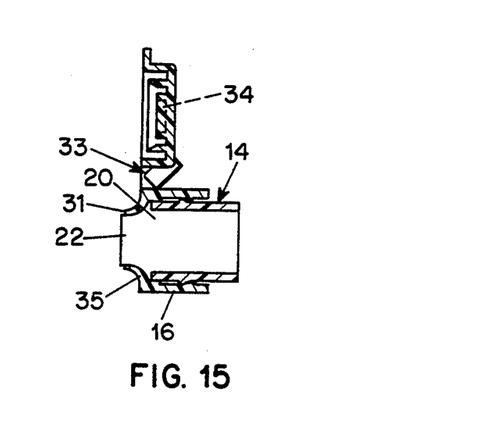
FIG. 15 is a sectional view from the side of the FIG. 14 nozzle.

With reference to FIG. 14, nozzle 16 is provided with longitudinal grooves 37 along its converging inner wall for retaining the inward sloping sides of the septum 20 residing therein. Such an arrangement maintains the septum 20 within a rigid position within the outlet means 17 and prevents intermixing of the streams at contact points of the assembled septum 20 and outlet means 17. The septum 20 extends to a location preferably 0.005 to 0.010 inches beyond the outlet means opening 23.

The nozzle 16 preferably has a cap 34 connected thereto by a hinge 33. Cap 34 includes a complimentary engaging means comprising recesses 31a and 22a for receiving respectively nozzle rim 31 and septum edge 22 during closure, so that intermixing of the two substances is prevented once the cap is closed.

The outlet means 17 is provided with one or more means for causing the outlet streams to flow toward each other and avoid the otherwise uncontrolled outlet flow which can result in the streams of the two or more materials flowing away from each other as they emerge from the outlet opening. The means may include a tapered septum 20 which divides the outlet, tapered peripheral walls on the outlet means as exemplified by nozzle 16, or a differential surface resistance on the interior walls of the outlet means, such that greater surface resistance is provided on the interior surfaces which are adjacent to other outlet openings than on the peripheral interior surfaces of the outlet means. Thus the surfaces of the septum 20 may be provided with a dull finish, such as by vapor honing, while the interior peripheral surfaces of nozzle 16 remain smooth. As the materials flow over the surfaces there will be greater resistance to the flow over the septum causing the flow of materials to "curl" in the direction of the septum as they emerge from the outlet, whereby the two or more streams of material curl towards each other and converge into a single stream. Alternatively, the interior peripheral surfaces of the outlet means can be treated, e.g. with a lubricant, such as polytetrafluoroethylene or silicone materials to reduce the surface friction of the interior peripheral surfaces as compared to the surface friction of the septum 20.

Figure 16:
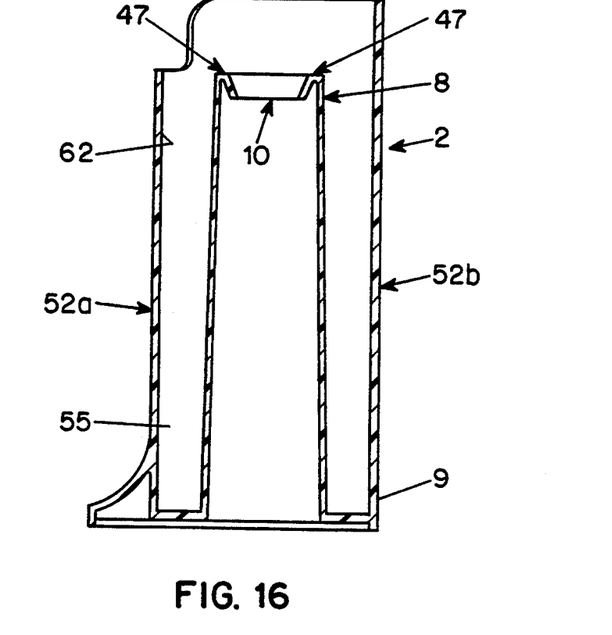
FIG. 16 is a sectional view from the side of a reusable base.

Referring once again to FIG. 1, it can be seen that means for selectively engaging reusable base 2, shown as horizontally extending catching ridge 61 protrudes outward from the longitudinal extending ridge 51 on the front side of dispensing head 1. This ridge is used to keep the dispensing head 1 from disengaging from the reuseable base 2 when the dispenser is lifted by dispensing head 1. As shown in FIG. 16, a corresponding catching rib 62 projects inward from the inside groove 55 of longitudinal extending ridge 52a of reuseable base 2. The two catching ridges engage when the base and dispensing head are pulled apart so as to prevent their separation. Referring back to FIG. 1, it can be seen that two vertically oriented slots 65 are formed on either side of catching ridge 61. This make the area around catching ridge 61 relatively flexible such that when the area 64 above it is pressed upon by a thumb or finger, catching ridge 61 moves inward sufficiently so that it will not engage with catching ridge 62 when dispensing head 1 is pulled apart from reusable base 2. This allows the dispensing head to be removed from the reusable base when the refill cartridge has been emptied so that it may be replaced with a full cartridge.

As an alternative to the vertical slots 65, the area around the catching ridge 61 may be made sufficiently flexible by making it thinner than the rest of the upper shroud 3.

Figure 17:
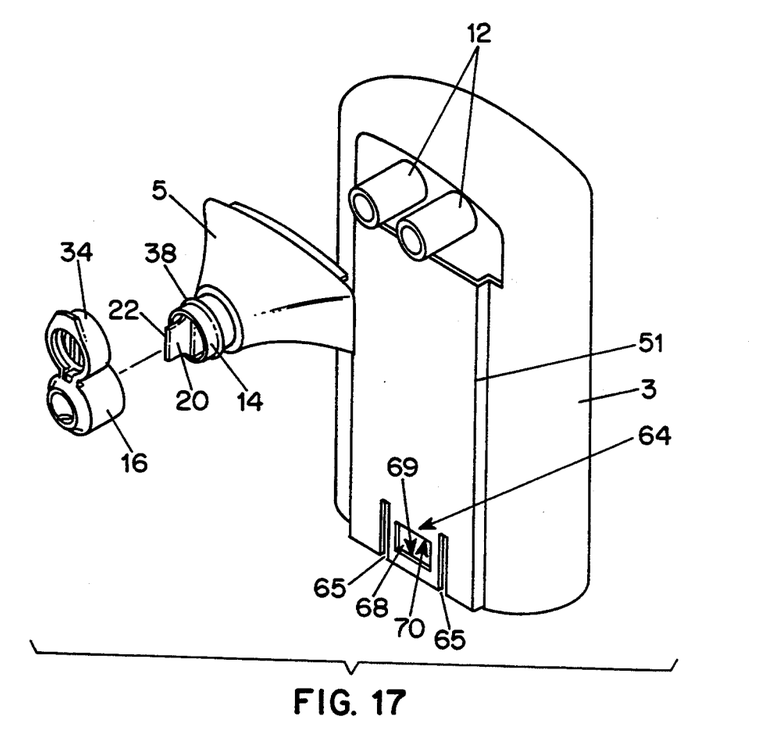
FIG. 17 is a perspective view of a dispensing head with a window.

As an alternative to the catching ridge 61, upper shroud 3 may be provided with a window 68 as shown in FIG. 17. In this embodiment the lower edge 69 of the windows serves as a means for selectively engaging the reusable base 2 via catching ridge 62. Once again vertical slots 65 on either side of the window 68 make the area relatively flexible such that when area 64 is pressed upon by a thumb or finger, the lower edge 69 moves inward sufficiently so that it will not engage the catching ridge 62 when refill cartridge 1 is pulled apart from reusable base 2. The upper edge 70 of the window is beveled so that it does not prevent the relative compression of the dispensing head 1 and the reusable base 2.

Figure 18:
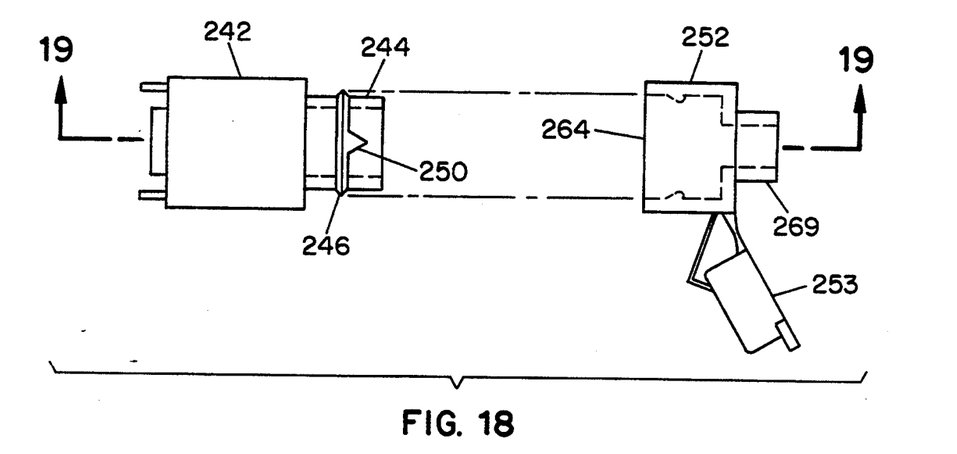
FIG. 18 is an alternate two piece outlet assembly.
Figure 19:
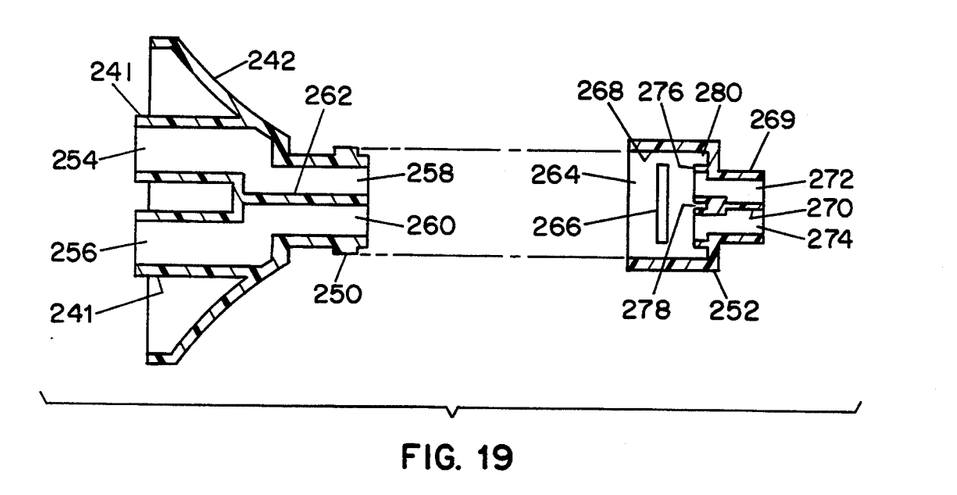
FIG. 19 is a cross-sectional view of the FIG. 18 outlet assembly.
Figure 20:
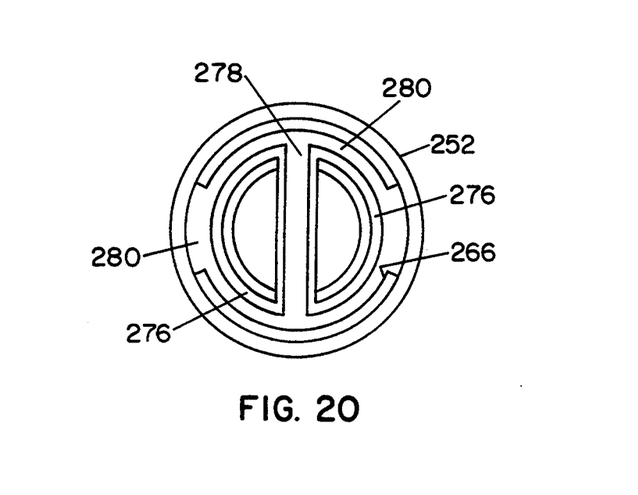
FIG. 20 is an enlarged interior end view of the nozzle member of the outlet of FIG. 18.

A preferred embodiment of outlet assembly 5 is shown in FIGS. 18, 19 and 20. Outlet assembly 5, as shown in FIGS. 12 and 13, includes a projecting thin septum 20, which may pose difficulties in fabrication. In the alternate embodiment of FIGS. 18 through 20 the outlet assembly 5 is fabricated of connecting part 242 and nozzle member 252, and the use of a thin projecting septum is eliminated.

Connecting part 242 includes a housing arrangement similar to that of part 5 which engages projecting outlets 12 of the refill cartridge and includes sleeves 241 which have internal passages 254 and 256. A cylindrical extension 244 of connecting part 242 includes an interior septum 262 extending to the forward end thereof and separating internal outlet passages 258 and 260 which are respectively connected to inlet passages 254 and 256.

A separate nozzle member 252 is arranged to snap fit over cylindrical extension 244 of connecting part 242. To facilitate the snap fit in an appropriate rotational orientation, cylindrical extension 244 is provided with an engaging rib 246 and triangular shaped locating protrusions 250. Nozzle member 252 has a recess portion 264 with an interior rib 266, shown in FIG. 19, which is engaged by rib 246. As shown in FIG. 19 interior rib 266 only extends partially around the peripheral nozzle member 252 whereby gaps are formed to receive triangular locating ridge 250 to assure appropriate angular orientation of nozzle member 252 when is fitted over extension 244. Nozzle member 252 includes a nozzle portion 269, which is circular in cross-section and includes septum 270 which bifurcates nozzle 269 into channels 272 and 274. Septum 270 is preferably tapered and textured as described above and extends to the outlet opening of nozzle member 252. The interior ends of channels 272 and 274 within recess 264 include projecting ribs 276 which form grooves 280 and 278 for receiving respectively the edges of the peripheral walls of extension 244 and septum 262. Tapered ridges 268 on the interior wall of recess 264 are arranged to press the peripheral edges of extension 244 of member 242 into close fit with ridges 276. In an exemplary embodiment four such tapered ridges are provided at equal spacing around recess 264.

Nozzle member 252 is provided with a snap fit cap pivotally mounted thereto having a configuration similar to cap 34.

When assembled, the peripheral edges of channels 258 and 260 are guided into the proper orientation of grooves 280 and 278 by triangular ridges 250 acting in conjunction with interior ridges 266. When fully inserted ridge 266 snaps behind rib 246 and the forward edges of extension 244 are pressed close to projections 276 by ribs 268, forming a close fit between outlet passages 258 and 260 of connecting part 242 and passages 272 and 274 of nozzle member 252.

While there have been described what are believed to be the preferred embodiment of the present invention, those skilled in the art will recognize that other changes and modifications may be made thereto without departing from the spirit of the invention and it is intended to claim all such changes and modifications as fall within the true scope of the invention.

I claim:

1. A refillable multi-cavity dispenser for the coextrusion of at least two flowable materials, comprising:
 a reusable dispensing head comprising at least two hollow and separate parallel outer cylinders, said outer dispensing cylinders having a first generally closed end and outlet channels at said closed end; and
 a disposable refill cartridge comprising two hollow and separate parallel inner cylinders, each inner cylinder being telescopically and sealingly accommodated within one of said outer dispensing cylinders, each inner refill cylinder for containing one of said flowable materials, said inner refill cylinders each having a generally open top end in fluid communication with said outlet channels, and a bottom end telescopically and slidingly accommodating piston heads which conform to ride sealingly along the interior walls of said inner refill cylinder so as to force said flowable materials to flow toward said top ends of said inner refill cylinders upon relative compression of said inner refill cylinders and piston heads, said piston heads being compressibly engageable with piston rods of a reusable base unit; and
 an outlet means in fluid communication with said outlet channels, said outlet means including adjacent outlet openings unconnected to each other and having means causing said flowable materials to flow toward each other at said outlet openings to form single banded, unmixed stream of said materials outside of said outlet means; and
 a reusable base unit which slidingly and telesopically accommodates said dispensing head, said base unit having piston rods which are compressibly engageably with said piston heads; and
 orientating means for allowing each inner refill cylinder to be telescopically accommodated by one of the outer cylinders and not by the other.

2. A refillable multi-cavity dispenser according to claim 1 wherein said orientating means comprise slots defined in the inner walls of the outer dispensing cylinders and corresponding tabs which protrude from the outer walls of the inner refill cylinders, said tabs and slots being arranged such that each inner refill cylinder can be telescopically accommodated only by one of the outer dispensing cylinders and not by the other.

3. A refillable multi-cavity dispenser according to claim 1 wherein said inner refill cylinders are attached to one another.

4. A refillable multi-cavity dispenser according to claim 3 wherein the orientating means comprises an orientating member extending between said inner refill cylinders, said orientating member being parallel to but offset from the imaginary plane extending between the axes of said inner refill cylinders and wherein said outer cylinders define slots which align with and receive said offset member when each of said inner refill cylinders are inserted in the appropriate outer cylinder.

5. A refillable multi-cavity dispenser according to claim 1 further comprising a pull tab means extending below the bottom ends of the inner refill cylinders and coupled to the inner refill cylinders for providing a surface to grasp when said refill cartridge is being removed from said dispensing head.

6. A refillable multi-cavity dispenser according to claim 1 further comprising flanges on the top ends of said inner refill cylinders.

7. A refill cartridge for use with a refillable multi-cavity dispenser for the coextrusion of at least two flowable materials, comprising:
 two hollow and separate parallel inner refill cylinders for being telescopically and sealingly accommodated within parallel outer dispensing cylinders of a reusable dispensing head, each inner refill cylinder containing one of said flowable materials, said inner refill cylinders each having an open top end and a bottom end telescopically and slidingly accommodating a piston head which conforms to ride sealingly along the interior walls of said inner refill cylinders so as to force said flowable materials to flow toward said top ends of said inner refill cylinders upon relative compression of said inner refill cylinders and piston heads, said piston heads being compressibly engageable with piston rods of a reusable base unit; and
 means for temporarily sealing said top ends of said inner refill cylinders; and
 orientating means for allowing each inner refill cylinder to be telescopically accommodated by one of the outer dispensing cylinders of a dispensing head and not by the other; and
 pull tab means extending below the bottom ends of the inner refill cylinders and coupled to the inner refill cylinders for providing a surface to grasp when said refill cartridge is being removed from a dispensing head.

8. A refill cartridge according to claim 7 wherein said orientating means comprise slots defined in the inner walls of the outer dispensing cylinders and corresponding tabs which protrude from the outer walls of the inner refill cylinders, said tabs and slots being arranged such that each inner refill cylinder can be telescopically accommodated only by one of the outer dispensing cylinders and not by the other.

9. A refill cartridge according to claim 7 wherein said inner refill cylinders are attached to one another.

10. A refill cartridge according to claim 9 wherein the orientating means comprises an orientating member extending between said inner refill cylinders, said orientating member being parallel to but offset from the imaginary plane which extends between the axes of said inner refill cylinders.

11. A refillable multi-cavity dispenser according to claim 7 further comprising flanges on the top ends of said inner refill cylinders.

* * * * *